March 20, 1962 H. W. DENISON ET AL 3,026,058
SPIN CASTING REEL
Filed May 14, 1958 2 Sheets-Sheet 1
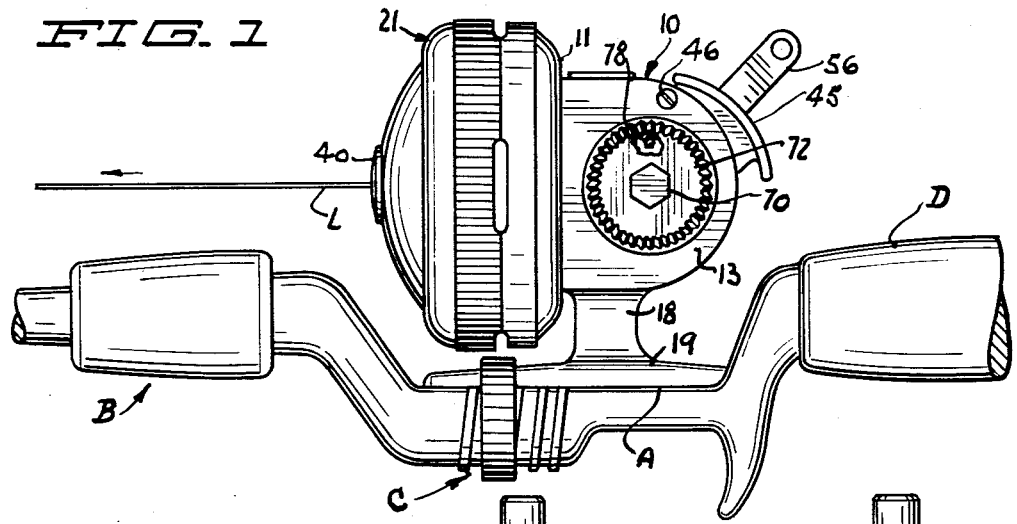
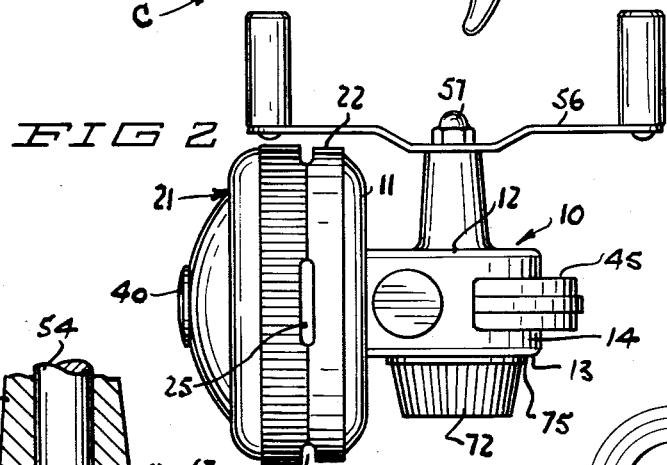
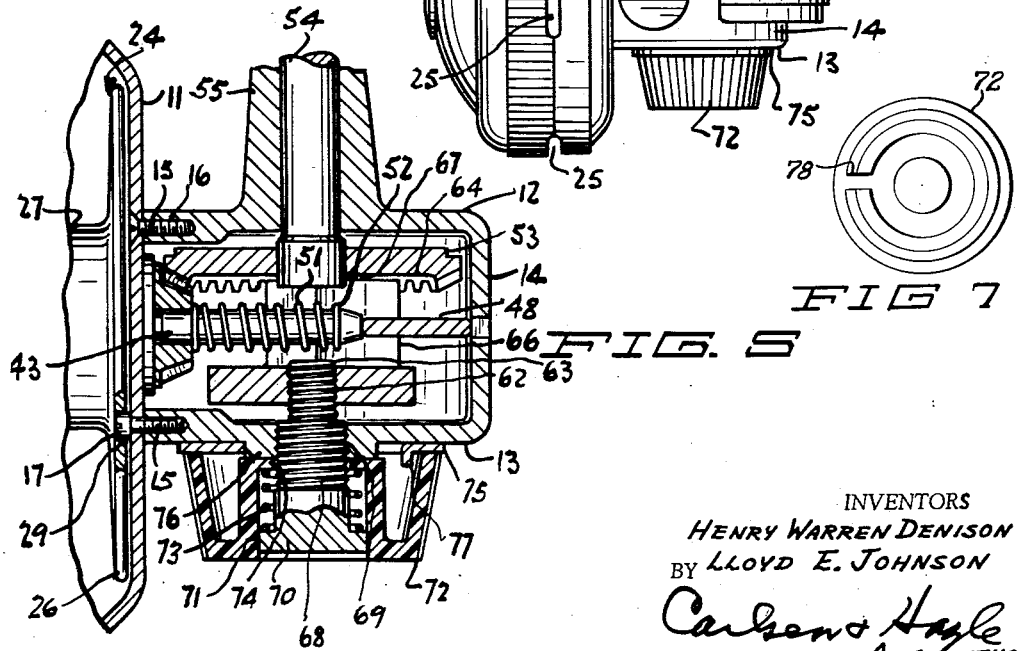
INVENTORS
HENRY WARREN DENISON
BY LLOYD E. JOHNSON
Carlson & Hayle
ATTORNEYS

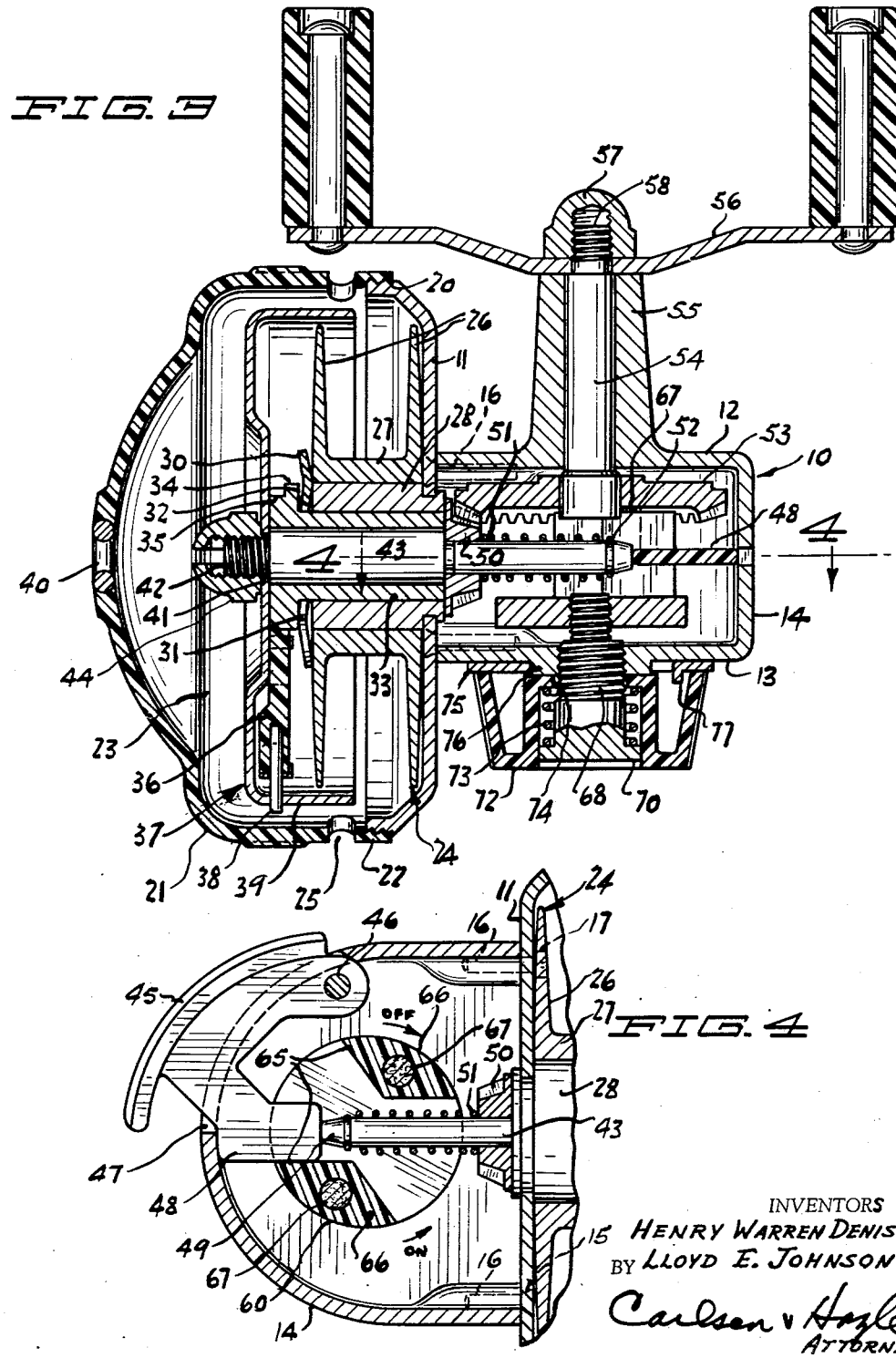

United States Patent Office 3,026,058
Patented Mar. 20, 1962

3,026,058
SPIN CASTING REEL
Henry Warren Denison, Mankato, Minn., F. Evelyn Denison, special administratrix of the estate of said Henry Warren Denison, deceased, and Lloyd E. Johnson, Mankato, Minn., assignors to Denison-Johnson, Inc., Mankato, Minn., a corporation of Minnesota
Filed May 14, 1958, Ser. No. 735,291
11 Claims. (Cl. 242—84.2)

This invention relates to improvements in fishing reels and more specifically to stationary spool reels.

Stationary or fixed spool reels are, of course, well known in the art and are coming into increasing use among fishermen for practicing the art of spin fishing in which very light lines, usually monofilament, are used. Inasmuch as the line in casting flows freely off the stationary spool very light lures may be cast long distances, as compared to ordinary casting equipment using the rotating line spool and comparatively shorter rod so well known for years prior to the advent of the spin fishing era. Spinning reels of the "open" type are used but the "closed" type is also becoming very popular and we have ourselves in fact invented, patented and marketed a number of these, as for example see our Patent No. 2,828,088 issued March 25, 1958, and more particularly the reel disclosed in our copending application Serial No. 551,297, filed December 6, 1955, now Patent No. 2,862,679, issued December 2, 1958. These closed types of reels, particularly as exemplified in the later of the patents just referred to, are not only quite rugged in construction, easy to keep in operating condition but most important of all lend themselves to use not only upon spinning rods for strictly spin fishing but also are so versatile that they may be used with facility upon casting rods for ordinary casting and even upon fly rods for fly fishing. This versatility requires that the reel be used either above or below the axis of the rod, as well as in different positions with respect to the fisherman's hand on the grip of the rod, and in the reel of the latter patent provision is made not only to permit operation in all of these positions, but with either right or left hand and with the operating crank turned in whatever direction of rotation which is most convenient to the user.

Because reels of this kind are used with lines of relatively low tensile strength it is vital that provision be made to permit the line to pay out from the reel, under the lunging of a heavy fish for example, if the line is not to be broken. Playing of large fish with light tackle is regarded as a job for experts but the very fact that these fixed spool reels do not backlash or overrun and tangle the line makes the reels particularly desirable to persons not in this expert class, and this only points up the necessity in such reels for a drag or brake which may be easily and accurately adjusted and which will retain its adjustment for long periods of time, all to the end that the line will automatically be released to pay out from the reel and thus not be broken, as is also known to the art.

It is the primary object of our present invention to greatly simplify the general type of closed spinning reel disclosed in our Patent No. 2,862,679, reducing its complexity and expense of production and providing a reel particularly suited for spin casting with a casting rod, where the reel is above the reel seat and forward of the casting hand. A reel particularly designed for this use has long been a desirable thing, particularly for a person just starting fishing, or someone fishing so seldom that proper thumbing of a rotating spool reel is a problem. Such a reel is useful also by experts, and by anyone during night fishing when a tangled line can well spoil an entire fishing trip.

Another object is to provide an improved drag or brake mechanism which may be adjusted with ease and with extreme precision, which will maintain adjustment without continual attention and which is simplicity itself to use and operate. It might be noted that it is quite often desirable to change line spools in reels of this type, for various reasons and our improved drag or brake, having no direct bearing on the spool, will be not one whit disturbed when spools are changed, and unless it is desired by the user subsequently to manually vary the magnitude of the braking force exerted.

These and other more detailed and specific objects will be disclosed in the course of the following specification, reference being had to the accompanying drawings, in which—

FIG. 1 is a side elevation of the reel and the adjacent portions of a casting rod upon which the reel is mounted and viewing the reel from the side at which the drag or brake is adjusted.

FIG. 2 is a top view of the reel alone.

FIG. 3 is a diametrical and enlarged horizontal sectional view through the reel.

FIG. 4 is an enlarged fragmentary, vertical and longitudinal section through a part of the reel as viewed substantially along the line 4—4 in FIG. 3.

FIG. 5 is a view similar to that of FIG. 3 but showing only the rear portion of the reel and illustrating to better advantage the manner in which the front plate is secured to the frame or casing portion of the reel.

FIG. 6 is a side view of washer element 75.

FIG. 7 is a bottom view of knob 72.

Referring now more particularly and by reference characters to the drawing our improved reel is seen to comprise a frame, designated generally at 10, including a circular forwardly arranged front plate 11 which is demountably secured over the forward, open end of a substantially semi-circular casing made up of spaced apart side plates 12 and 13 joined by a wall or connecting web 14. For so mounting the front plate 11 the same is apertured for the reception of a plurality of mounting screws, indicated throughout at 15, which are threaded into suitable tapped sockets 16 adjacent the junctions between the side plates 12—13 and the wall 14. All but one of said mounting screws 15 are of the countersunk variety but the other is a fillister head screw, the head of which appears at 17 in FIG. 5 and which serves a purpose in addition to mounting the front plate as will presently appear. Depending from the frame 10 is a shank 18 formed into an elongated tang 19 which is held upon the reel seat A of a casting rod B by the usual reel mounting C appearing in FIG. 1, thus mounting the reel above the reel seat and forwardly of the handle D of the casting rod in the usual position for practicing the art of bait casting.

The peripheral edges of the front plate 11 are turned forwardly and externally threaded, as indicated at 20, so that a substantially conical cover 21 having an internally tapped rear edge 22 may be screwed upon the frame 10 to forwardly project therefrom and form an enclosure 23 wherein is mounted a line spool, designated generally at 24. As stated hereinbefore the reel is thus of the closed variety as opposed to the open type of spinning reel in which the line spool is exposed to view, although the cover 21 may be readily removed for access to the interior of the reel and the flange of the cover is provided with openings 25 at strategic points from which water may drain from the line coiled upon the spool 24. The line appears at L in FIG. 1 of the drawing. The spool 24 has spaced apart circular flanges 26 emanating from a hub 27 which seats upon an outer bearing sleeve 28 stationarily secured at the center of the front plate 11 and extending forwardly therefrom. As has also been set forth hereinbefore this is a fixed spool type of reel and the rearmost of the flanges 26 is thus provided, as seen in FIG. 5, with an opening 29 which accommodates the fillister head 17 of the one mounting screw in order to prevent rotation of the spool but to permit the same to be drawn forwardly off the outer bearing sleeve 28 in changing spools. Normally, however, the removal of the spool 24 from this sleeve is prevented by means of a substantially U-shaped spring clip 30 having spaced apart legs 31 which are bowed, as viewed from the edge (in FIG. 3) and which legs are set astraddle in a recess 32 intervening between the forward end of the sleeve 28 and an inner bearing 33 which is pressed into said sleeve. Said bearing 33 has a diametrically enlarged outer end 34 to retain the clip 30 in place and forwardly of this end 34 the bearing 33 is also provided with a cam surface 35 against which rides a generally radially extending and movable line pick-up finger or element 36 slidable within a line spooling member, designated generally at 37. This structure has been set out in detail in our prior Patent No. 2,862,679 and need not be repeated herein, it being sufficient to state that normally the line pick-up element 36, or rather its finger-like outward extension 38, will be projected radially outward by the cam surface 35 to the position of FIG. 3, at which the extension 38 will project from the circumferential flange 39 of the line spooling member 37 so that rotation of the latter will coil or spool a line in the space between the flanges 26 of the line spool 24. The line L passes from the spool outwardly and then forwardly along this flange 39 of the line spooling member and thence inwardly and finally outwardly through a line guide or eyelet 40 at the center of the cover 21 which, as will be noted, is so shaped as to dispose this line guide substantially forwardly of the line spooling member.

The line spooling member, designated at 37, is secured at its center 41 to the threaded forward end 42 of an actuating shaft 43 extending rearwardly through the innermost bearing 33 into the space between the side plates 12 and 13. A coin-slotted nut 44 is used to mount the spool member upon this shaft. The shaft 43 is arranged not only for rotation within the bearing 33 but for axial, forward and rearward sliding movements and to accomplish the latter purpose a thumb piece 45 is pivoted between the side plates 12 and 13 upon an upwardly and forwardly located mounting screw 46 and this thumb piece, while it is exposed at the upper rear portion of the reel convenient for operation by the thumb of the hand grasping the handle D of the rod, also enters the space between the side plates 12 and 13 through a slot in the wall or web 14, which slot is indicated at 47 and appears to best advantage in FIG. 4. The thumb piece 45 also has a forwardly extending end portion 48 which abuts the rear end 49 of the shaft 43 so that forward pressure upon the thumb piece will push the shaft 43 and spooling member 37 forwardly until the pick-up element 36 clears the cam surface 35 upon which the extension finger 38 will move inwardly out of the path of the line flowing from the spool 24 and the line may be cast from the fixed spool 24 with true spinning action. Thumbing of the line to halt the outward flow thereof and properly position the lure upon the extremity of the line is brought about, as pointed out in our prior patents, by snubbing the line between the line spooling member 37 and any conveniently adjacent inner portion of the cover 21.

Rearwardly of the bearing 33 the shaft 43 is reduced and is other than circular in cross section so that it may slidably but non-rotatably engage a drive pinion 50 forming part of the mechanism for rotation of the line spooling member 37. This pinion 50 is held forwardly in place against the rear extremities of the bearings 28 and 33 and normally the shaft 43 is projected rearwardly by means of an expansion coil spring 51 located around the rear portion of the shaft and braced between said pinion and a snap ring 52 disposed about the rear end portion of the shaft, as will be readily evident. In constant mesh with one side of the pinion 50 is a rotary element in the form of a drive gear 53 secured upon the inner end of a shaft 54, which shaft is journaled outwardly through a bearing 55 on one of the side plates 12 or 13 and here shown as being the right hand side plate 12, since the reel disclosed is for right hand operation. Outwardly of said bearing 55 the shaft 54 has secured thereto a manually operative crank 56 held in place by a nut 57 threaded at 58 upon the shaft. It will be apparent that rotation of the crank 56 in one direction, as determined by the direction in which the line is coiled upon the spool 24, will properly rotate the spooling member 37 to retrieve the line, whereas rotation of the crank in the opposite direction will not be effective for this purpose in the present reel.

According to our present invention we provide a brake or drag mechanism which acts to resist rotation of the rotatable element here constituted by the drive gear 53 in the direction opposite to that at which this gear is turned by hand to reel in or re-spool the line as has just been described. If such rotation of the drive gear is thus braked, accurately, smoothly and precisely the spooling member 37 (to which said gear is connected) is permitted only retarded back rotation as the line L pays out as indicated by the arrow in FIG. 1. For example, if a cast has been made, the line retrieve started by manually turning the handle 56, and a heavy fish strikes, the fisherman, once the hook is set, may release the handle and let the fish fight the rod, pulling out line as may be required by harder than usual lunges and rushes. Then as the fish begins to tire the handle may again be turned by the fisherman to reel in the game and only ordinarily prudent care is required to successfully play a heavy fish by this method, the handle being turned to retrieve line or released to let the line run out as conditions justify.

This brake or drag mechanism comprises a brake shoe 60 having a center, tapped opening screwed upon the inner threaded end 62 of an adjustment screw 63 or other suitable support, located in opposition to an inner smooth annular face 64 upon the drive gear 53. Said shoe 60 is notched at 65 to provide spaced apart lugs 66 of angular configuration, extending toward the drive gear and so loosely straddling or embracing the rear end portion of the shaft 43 that the same will not restrict limited, opposite direction rotational movements of the brake shoe on the screw end 62. For such purpose the notch 65 may have its ends flared in an outward, radial direction as seen in FIG. 4, providing added clearance between the lugs 66. The ends of the lugs 66 are recessed to receive plugs 67 of felt or the like which bear lightly upon the gear face 64 and, assuming the brake shoe to be properly spaced with reference to this gear face, and the pitch of the threads 62 to be proper with respect to the direction of rotation of the drive gear, then rotation of the latter to retrieve the line will turn the brake shoe on the axis of the threads in the direction of the "off" arrow in FIG. 4 because of the frictional drag of these plugs. Such motion of the shoe may possibly continue until it is halted by contact of one of the lugs with the end 48 of the thumb piece but the resistance to rotation of the drive gear will not be at all noticeable. But when the handle 56 is released to allow a fish to pull out line the opposite or back rotation of the drive gear 53 will turn the brake shoe 60 in an opposite direction, that of the "on" arrow in FIG. 4, the threads at 62 will move the shoe toward the drive gear and the ends of the lugs 66 will be brought to bear with frictional braking force upon the drive gear face 64, all with the result that the outward flow of the line will be braked as will be understood. Just as soon, however, as the handle is taken hold of again and turned to reel in the line this braking force will be relieved. As the brake is applied rotation of the shoe 60 is prevented by engagement of the other of the lugs with the end 48 of thumb piece 45.

In order to meet all operating conditions and to accommodate the drag or braking mechanism to use with lines having different tensile strengths, it is necessary that the screw 63 forming the adjustable support for the brake shoe 60 be adjusted toward and away from the drive gear 53. For this purpose this screw is provided with a diametrically enlarged outer threaded portion 68 fitted through a tapped opening 69 for its reception in the side wall 13 on an axis coincident with that of the shaft 54, but spaced therefrom, of course. The outer end 70 of this enlarged portion of the screw is hexagonal or of other than circular shape for axially slidable but relatively non-rotatable engagement in a similarly shaped center recess 71 in a manually movable member or brake adjustment knob 72 located outside of the side wall 13. Said knob 72 is of substantial diameter and peripherally knurled so that it may be readily adjusted, and quite precisely so. An expansion coil spring 73 is disposed around the outer portion of the screw 63 and braced between the head 70 thereof and a flange 74 turned inwardly from the central portion of the knob 72 so that normally the knob will bear inwardly against a washer 75 which is adjustable in predetermined angular increments or steps about the axis of the screw by the engagement of the center of the washer with a hexagonal protrusion 76 provided for this purpose upon the outer face of the side wall 13. An ear 77, as shown in FIG. 6, is turned outwardly from the washer 75 within the outer wall of the knob 72 into the path of a radially located rib 78 forming part of the knob as shown in FIG. 7.

It will now be understood that by turning the knob 72 the screw 63 may be adjusted for substantially one complete revolution and, limited by rib 78 engaging ear 77 determined by the difference between the pitch of the threads employed at 68 and at 62, a substantial adjustment of the brake shoe 60, toward and away from the face 64 of the drive gear 53, will be the result. In most cases this range of adjustment will suffice but should it be desired to extend the range of adjustment thus provided it is only necessary to grasp the knob 72, pull the same outward against the resistance of the spring 73 until the rib 78 may clear the ear 77 and be moved a step or more in the proper direction whereupon the knob may be moved to bring about an entire new range of adjustment. It will thus be seen that provision for fine and coarse range adjustment is possible by manipulation of the washer member 75 about hexagonal protrusion 76, and by manipulation of knob 72 in regard to ear 77 on washer 75 and rib 78 positioned on the inside of knob 72.

The threads at 68 preferably have a greater pitch than and are in the same direction as the threads at 62. As screw 63 is turned by knob 72 it moves axially through side plate 13 as determined by the pitch of the threads 68 toward and away from gear 53. The drag shoe element 60 threadingly engaged to screw 63 is limited in rotation by thumb piece 48 and therefore as screw 63 is turned it moves axially therethrough at the pitch of the threads 62 resulting in a movement of element 60 toward and away from the gear 53 determined by the difference of pitch between the two threaded portions.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. For a fishing reel having a frame, a line spool supported on the frame, a rotatably mounted line spooling member for winding line on the spool, a pinion and means connecting said pinion to rotate the said spooling member, a pair of opposed side plates on the frame, a handle and a drive gear disposed on one side plate and operative when rotated unidirectionally by the handle to engage the pinion to rotate the spooling member and spool a line on said spool; drag mechanism comprising a screw manually adjusted on the other side plate on the same axis as said drive gear and toward and away from the said gear, a brake shoe threaded on said screw and having means lightly frictionally engaging the said drive gear, said brake shoe turning on the screw and moving toward the drive gear when said drive gear rotates in a direction opposite that at which it turns to spool the line whereby the shoe will frictionally engage and brake said drive gear, and means for limiting rotation of said brake shoe on the screw under influence of opposite rotational movements of the drive gear.

2. For a fishing reel having a frame, a line spool supported on the frame, a rotatably mounted line spooling member for winding line on the spool, a pinion and means connecting said pinion to rotate the said spooling member, a pair of opposed side plates on the frame, a handle and a drive gear disposed on one side plate and operative when rotated unidirectionally by the handle to engage the pinion to rotate the spooling member and spool a line on said spool; drag mechanism comprising a screw manually adjusted on the other side plate on the same axis as said drive gear and toward and away from the inner face of said gear, a brake shoe threaded on said screw and having means lightly frictionally engaging the face of said drive gear, said brake shoe turning on the screw and moving toward the drive gear when said drive gear rotates in a direction opposite that at which it turns to spool the line whereby the shoe will frictionally engage and brake said drive gear, and means for limiting rotation of said brake shoe on the screw under influence of opposite rotational movements of the drive gear, said last mentioned means constituting a thumb piece also operative to control said line spooling member.

3. For a fishing reel having a frame, a line spool supported on the frame, a rotatably mounted line spooling member for winding line on the spool, a pinion and means connecting said pinion to rotate the said spooling member, a pair of opposed side plates on the frame, a handle and a drive gear disposed on one side plate and operative when rotated unidirectionally by the handle to engage the pinion to rotate the spooling member and spool a line on said spool, the side plate opposite the drive gear having a screw manually adjustable on the same axis as said drive gear and toward and away from a face of said gear, and a brake shoe threaded on said screw and having means lightly frictionally engaging the face of said drive gear, and said brake shoe turning on the screw when the drive gear rotates in a direction opposite that at which it turns to spool the line and the shoe moving toward the drive gear to brake the same.

4. For a fishing reel having a frame, a line spool supported on the frame, a rotatably mounted line spooling member for winding line on the spool, a pinion and means connecting said pinion to rotate the said spooling member, a pair of opposed side plates on the frame, a handle and a drive gear mounted on one of said side plates and operative when rotated unidirectionally by the handle to engage the pinion to rotate the spooling member and spool a line on said spool, the side plate opposite the drive gear having a screw manually adjustable on the same axis as said drive gear and toward and away from a face of said gear, and a brake shoe threaded on said screw and having means lightly frictionally engaging the face of said drive gear, said brake shoe turning on the screw when the drive gear rotates in a direction opposite that at which it turns to spool the line and the shoe moving toward the drive gear to brake the same, said screw being itself threaded through said side plate, a manually movable member operatively engaging the screw outside the side plate for moving both the screw and brake shoe toward and away from said drive gear, and means adjustably limiting rotation of the screw by said manually movable member.

5. For a fishing reel of the character described which includes a frame having a housing wall and laterally spaced side plates and a forwardly extending hollow bearing, a line spool stationarily mounted upon the said bearing, a shaft rotatably and forwardly slidably mounted through the bearing, a line spooling member secured to the forward end of the shaft and responsive on forward movement to free the line to flow forwardly off the spool, means including a crank and meshing gears for manually rotating the shaft and said spooling member in one direction of rotation at which the line will be carried upon the spool, and a thumb piece pivoted in the housing and exposed at the rear thereof and having a forwardly extending element engaging the rear end of the shaft to urge the same forwardly responsive to pressure on the thumb piece, the improvement which comprises a brake mechanism including a notched brake shoe located between said side plates and having spaced lugs which clear said shaft and extend toward one of said gears, a screw on one of said side plates and said brake shoe being threaded upon sai dscrew for limited rotation thereupon, and means upon said lugs frictionally engaging said gear to turn the brake shoe as said gear rotates when line pays off the spool and to move the lugs toward and into braking engagement with the gear.

6. For a fishing reel of the character described which includes a frame having a housing wall and laterally spaced side plates and a forwardly extending hollow bearing, a line spool stationarily mounted upon the said bearing, a shaft rotatably and forwardly slidably mounted through the bearing, a line spooling member secured to the forward end of the shaft and responsive on forward movement to free the line to flow forwardly off the spool, means including a crank and meshing gears for manually rotating the shaft and said spooling member in one direction of rotation at which the line will be carried upon the spool, and a thumb piece pivoted in the housing and exposed at the rear thereof and having a forwardly extending element engaging the rear end of the shaft to urge the same forwardly responsive to pressure on the thumb piece, the improvement which comprises a brake mechanism including a brake shoe located between said side plates and notched to provide spaced apart lugs which clear said shaft and extend toward one of said gears, a manually adjustable screw on one of said side plates and said brake shoe being threaded upon said screw for rotation thereupon, and means upon said lugs frictionally engaging said gear to turn the brake shoe as said gear rotates when line pays off the spool and to move the lugs toward and into braking engagement with the gear, said thumb piece having an end portion engaging the shaft and acting also as a stop to limit rotation of the brake shoe.

7. For a fishing reel having a frame, a line spool supported on the frame, a rotatably mounted line spooling member for winding line on the spool, manually operable means including a drive gear for rotating said spooling member, a pair of opposed side plates on the frame, one of said side plates opposing said gear and having a screw threaded therethrough, said screw being on the same axis as said gear and being adjustable toward and away from the gear, a brake shoe threaded on said screw and having means lightly frictionally engaging the said gear, the brake shoe turning on the screw when the gear rotates in a direction opposite that for winding a line on the spool and the shoe moving toward the gear to brake the same, a manually rotatable device having a stop rib and being operatively engaged with said screw, a spring urging the device against the side plate, and an outwardly extending ear on the side plate for engaging the stop rib with the device being outwardly movable for clearing the rib from the ear.

8. In a fishing reel, a frame, a line spool supported on the frame, a rotatably mounted line spooling member for winding line on the spool, a pinion for rotating the spooling member, said frame including a pair of opposed side plates, one of said plates having a bearing, a manually operated shaft journaled in the bearing, a drive gear rotated by the shaft and meshing with said pinion to unidirectionally rotate the same, a manually adjustable screw threaded in the other of said side plates for movements toward and away from the drive gear, and a drag element threadingly mounted on the screw for axial movement upon relative rotation between the screw and drag member, said drag member frictionally engaging the gear to be turned thereby on the screw for movement toward the gear to increase the friction therewith to thereby yieldably brake the spooling member against rotation in the direction opposite to that in which it turns when winding line on the spool.

9. In a fishing reel, a frame, a line carrying spool supported by the frame, manually operative mechanism for spooling a line on said spool, said mechanism including a first bi-directionally rotatable element spooling said line upon manual rotation in one direction and allowing line to flow off the spool upon rotation in the opposite direction, a second bi-directionally rotatable element drivingly connected to said first element, bearing means on said frame rotatably supporting said elements, brake mechanism comprising a manually adjustable screw on said frame coaxial with one of said elements and adjustable toward and away from such element, a brake shoe threadingly engaging the screw for axial movement when the brake shoe and screw are turned with respect to each other, said shoe having a surface for frictional contact with said one element so as to be turned thereby on the screw so as to move the shoe axially on the screw and into braking contact with said element.

10. In a fishing reel, a frame, a line carrying spool supported by the frame, manually operative mechanism for spooling a line on said spool, said mechanism including a first bi-directionally rotatable element for spooling said line upon manual rotation in one direction and allowing line to flow off the spool upon rotation in the opposite direction, a second bi-directionally rotatable element operatively connected with said first rotatable element, bearing means on said frame rotatably supporting said elements, brake mechanism comprising a manually adjustable screw threaded in the frame coaxial with one of said elements and adjustable toward and away from such element, a brake shoe threadingly engaging said screw and having a portion bearing against said last mentioned element and operative as that element rotates in the direction to allow line to flow off the spool to turn the shoe on the screw and move the shoe into frictional braking contact with said element, said brake shoe being movable on said screw by rotation of said contacted element into braking engagement therewith, said screw, when turned in the frame, being operative to control the degree of said frictional braking contact.

11. In a fishing reel, a frame, a line carrying spool mounted on the frame, manually operative mechanism for spooling a line on said spool including a bi-directionally rotatable member carried by the frame, said member having a friction providing surface, a drag shoe disposed adjacent to said member and in contact with the friction providing surface thereof, manually adjustable means supporting the drag shoe and operative to increase or decrease the frictional contact between the shoe and said member, said shoe supporting means including a screw threaded element connecting the shoe and adjusting means and threaded in the shoe and permitting turning and axial movement of the drag shoe on the threaded element and with respect to the rotatable member whereby when the member is rotated in one direction its frictional contact with the shoe will turn the latter on the threaded element in a direction which will increase such friction, while rotation of the member in the opposite direction will turn the shoe in a direction which will decrease such friction.

References Cited in the file of this patent

UNITED STATES PATENTS

| | | |
|---|---|---|
| 1,139,252 | Bordner | May 11, 1915 |
| 2,478,111 | Kilian | Aug. 2, 1949 |
| 2,566,344 | Lord | Sept. 4, 1951 |